United States Patent [19]

Bloch et al.

[11] Patent Number: 4,555,871

[45] Date of Patent: Dec. 3, 1985

[54] METHOD AND APPARATUS FOR ELIMINATING UNDULATION ERRORS ON GEAR-TOOTH FLANKS IN PRODUCTION GEAR-FABRICATING MACHINES

[75] Inventors: Peter Bloch, Mutschellen; Otto Schneider, Gränichen; Meinrad Donner, Nuolen, all of Switzerland

[73] Assignee: Maag Gear-Wheel & Machine Company Limited, Zurich, Switzerland

[21] Appl. No.: 659,182

[22] Filed: Oct. 9, 1984

[30] Foreign Application Priority Data

Oct. 18, 1983 [CH] Switzerland ............... 5659/83

[51] Int. Cl.[4] ............................. B24B 1/00
[52] U.S. Cl. ..................... 51/52 R; 51/95 GH; 51/287; 409/15
[58] Field of Search ............ 409/5, 11, 12, 15; 51/52 B, 52 HB, 95 GH, 287, 165.72

[56] References Cited

U.S. PATENT DOCUMENTS

| | | | |
|---|---|---|---|
| 3,152,422 | 10/1964 | Loxham | 51/52 R |
| 4,253,050 | 2/1981 | Angst | 51/95 GH |
| 4,329,096 | 5/1982 | Herscovici | 51/95 GH |
| 4,414,495 | 11/1983 | Sumi | 51/52 HB |
| 4,467,568 | 8/1984 | Bloch | 51/52 R |

Primary Examiner—Harold D. Whitehead
Attorney, Agent, or Firm—Werner W. Kleeman

[57] ABSTRACT

In order to eliminate undulation errors in gear production wherein a generating motion of a gear-tooth flank of a gear fixed to a rotary table corresponding to an involute profile is induced by simultaneously imparting a predetermined rotary motion and a predetermined translatory motion to the rotary table, a reference ratio of these two speeds is determined, the momentary speeds of the table are measured and a momentary ratio is determined therefrom. A difference value is formed between the reference ratio and the momentary ratio. This difference value is first formed for each gear-tooth flank during one revolution and then stored in association with the momentary generating position of the gear and with the momentary stroke position of the gear-fabricating tool and only when the same gear-tooth flank is reached during a further revolution is the adjustment value of the gear-fabricating tool corrected by means of the stored difference values.

8 Claims, 4 Drawing Figures

METHOD AND APPARATUS FOR ELIMINATING UNDULATION ERRORS ON GEAR-TOOTH FLANKS IN PRODUCTION GEAR-FABRICATING MACHINES

BACKGROUND OF THE INVENTION

The present invention broadly relates to gear-cutting and, more specifically, pertains to a new and improved method and apparatus for eliminating undulation errors in commercially produced gears.

Generally speaking, the method of the present invention is for eliminating undulation errors on gear-tooth flanks when fabricating gears on a production gear-fabricating machine, wherein a generating motion corresponding to a desired involute profile is induced between a gear-fabricating tool and a gear-tooth flank by rotating a rotary table upon which a gear being fabricated is fixed at a predetermined angular velocity and by simultaneously translating the rotary table at a predetermined linear velocity.

The apparatus of the present invention for eliminating undulation errors on gear-tooth flanks when fabricating gears in a production gear-fabricating machine having a rotary table for the gear to be fabricated comprises a first drive mechanism associated with the rotary table for rotating the rotary table at a predetermined angular velocity together with the gear to be fabricated and a second drive mechanism associated with the rotary table for simultaneously translating the rotary table at a predetermined linear velocity together with the gear to be fabricated for the purpose of inducing a generating motion corresponding to a desired involute profile between at least one gear-fabricating tool and at least one gear-tooth flank. It also comprises measurement devices associated with the rotary table for monitoring the angular and linear velocities.

It is known, for instance from the technical journal "Werkstatt und Betrieb", No. 113 (1980) 2, pages 97 to 100, that the gear-tooth flanks of gears cut by the generating process have corrugated or undulating irregularities. These corrugations or undulations are particularly apparent in helical gears and result principally from errors of the rotary drive worm and of the linear drive spindle which induce the generating motion by imparting a rotary motion with a predetermined speed and simultaneously a translatory motion with a predetermined speed to the rotary table of the machine. The periodic, relatively long-wave and therefore very dangerous corrugations or undulations are due to errors of eccentricity, aplanarity, run-out or wobble, axial play and angular velocity as well as errors of helical pitch and pressure angle of the rotary drive worm and of the translatory drive spindle.

In general, all of the gearing errors of the rotary table drive are effective to a greater or lesser extent. Worm drives can also have circular pitch errors and errors of journaling the worm (eccentricity). These errors in the rotary table drive result in periodical corrugations or undulations in the direction of the profile (tooth height) in the finished gear and, in helical gears, also in periodical corrugations or undulations in the direction of the tooth width (cf. W1 and W2 in FIG. 1).

Since the periodical corrugation (the so-called undulation) is continuously periodic and does not just arise sporadically upon the gear periphery, it constitutes a particularly onerous source of generation of vibrations and noise.

In the present state-of-the-art (cf. the aforementioned technical journal) attempts are being made to prevent gear-tooth corrugations or undulations by means of as exact as possible a machining of all important drive components of the production machine. That is, however, only possible within limitations, since the tolerances maintained on large gears in the present state-of-the-art are already so small that they can only be detected with great difficulty by measurement technology.

SUMMARY OF THE INVENTION

Therefore, with the foregoing in mind, it is a primary object of the present invention to provide a new and improved method and apparatus for eliminating undulations in gear-tooth flanks which do not exhibit the aforementioned drawbacks and shortcomings of the prior art constructions.

Another and more specific object of the present invention aims at providing a new and improved method and apparatus for eliminating undulations in gear-tooth flanks of the previously mentioned type with which gear-tooth undulations can be eliminated in gear-fabrication in production gear-fabricating machines in reliable and considerably simpler manner.

Yet a further significant object of the present invention aims at providing a new and improved apparatus for eliminating gear-tooth flank undulations of the character described, wherein such apparatus is relatively simple in concept and design, extremely economical to realize, highly reliable in operation, not readily subject to malfunction and requires a minimum of servicing.

Now in order to implement these and still further objects of the invention, which will become more readily apparent as the description proceeds, the method of the present invention is manifested by the features that it comprises the steps of determining a reference ratio between a reference angular velocity and a reference linear velocity for the rotary table, measuring momentary angular velocities and momentary linear velocities of the rotary table during fabrication of each gear-tooth flank, determining momentary ratios between the momentary angular velocities and the momentary linear velocities, forming difference values between the reference ratio and the momentary ratios, storing the difference values in association with momentary generating motion positions of the gear being fabricated and in association with momentary stroke positions of the gear-fabricating tool in a storage register at least until a further fabricating cycle, and correcting feed motion values for the gear-fabricating tool by the amount of the difference values during the further fabricating cycle for each gear-tooth flank at the associated generating motion and stroke motion positions.

The apparatus of the present invention is manifested by the features that it comprises a computer for determining a reference ratio between a reference angular velocity and a reference linear velocity for the rotary table, a generating roll position transducer for determining a momentary generating roll position of the gear to be fabricated and a stroke position transducer for determining a momentary stroke position of the gear-fabricating tool. It also comprises a first measuring device for measuring momentary angular velocities of the rotary table and a second measuring device for measuring momentary linear velocities of the rotary table. It also comprises a first device for determining momentary ratios between the momentary angular velocities measured by the first measuring device and the momentary linear velocities measured by the second measuring device as well as a second device for forming difference values between the reference ratio and the momentary ratios. The second device has an output and the computer has a generating roll and stroke output. The apparatus also comprises a storage device connected to the output of the second device and to the generating roll and stroke output of the computer for storing the difference values in association with momentary generating roll positions of the gear to be fabricated and in association with momentary stroke positions of the gear-fabricating tool. The storage device has an output. The gear-fabricating tool has a servo-valve and a correction device is connected to the output of the storage device and to the servo-valve for correcting feed motion values for the gear-fabricating tool by the amount of the difference values.

The invention is based upon the surprising recognition that the gear-tooth flank corrugations or undulations arising in gear-tooth flanks during gear production are, as a whole, due to errors in the drive ratio of the drive train between the rotary table and its drive mechanisms. This drive ratio is defined as the ratio between the rotary speed and the translatory speed of the rotary table. When the rotary table rotates at a predetermined rotary speed or angular velocity and simultaneously translates at a predetermined translatory speed or linear velocity and there are no gearing errors or the like in the drive train, then the error in this drive ratio will be zero. This ideal case is, however, practically never achieved, since gearing errors in the worm or in the linear drive spindle in the micrometer range can never be completely avoided. If, for instance, a flank of the worm should have an undesired protuberance or bump, then the rotary table would turn with a somewhat higher rotary speed or angular velocity than the prescribed rotary speed or angular velocity. The drive ratio defined by the relation between the rotary speed or angular velocity and the translatory speed or linear velocity changes correspondingly. Analogous reasoning applies when the drive train consists only of two separate, electrically synchronized servo-motors imparting a rotary speed or angular velocity and a translatory speed or linear velocity to the rotary table.

According to the invention, a deviation from the prescribed reference drive ratio is determined and the adjustment value or feed motion value of a gear-fabricating tool is thereby corrected. Since it will, due to unavoidable mechanical and electrical inertia in the apparatus, not be possible in practical cases to simultaneously determine the deviation from the reference drive ratio and correct it by means of a corresponding adjustment of the gear-fabricating tool, in a first or given machining cycle the deviation determined for each gear-tooth flank is temporarily stored in association with the momentary generating position of the gear and with the momentary stroke position of the gear-fabricating tool. That is, no machining correction is immediately undertaken. In a further machining cycle, such as a further revolution of the gear being fabricated, the stored deviation corresponding to each gear-tooth flank is then employed at the proper time to correct the feed motion of the gear-fabricating tool.

In a further embodiment of the invention, the gear-fabricating machine comprises a further gear-fabricating tool and the feed motion values of the further gear-fabricating tool are simultaneously corrected by the amount of the drive ratio deviation but with opposite or inverted algebraic sign.

In yet a further embodiment of the invention in which the drive motors of the rotary table are provided with regulation circuits for regulating the rotary speed of these motors, the drive speed of these motors is additionally corrected with the aid of the momentary angular velocity and the momentary linear velocity of the rotary table, so that the finally determined deviation from the predetermined drive ratio is in total smaller, which permits an even more exact elimination of the gear-tooth flank corrugations or undulations.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
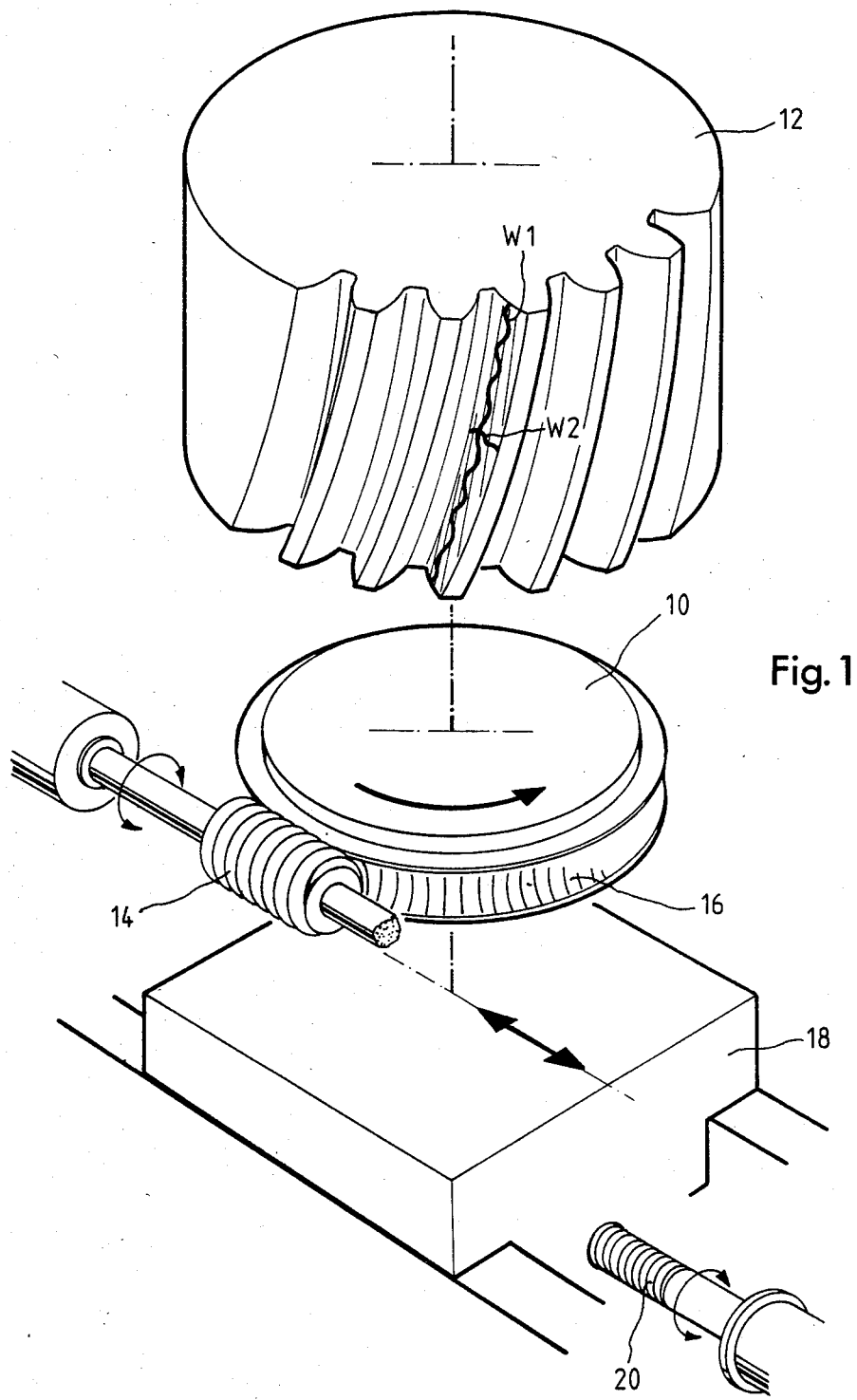
FIG. 1 schematically shows in exploded view the drive of a rotary table of a production gear-fabricating machine by means of a rotary drive mechanism and a linear drive mechanism.

Describing now the drawings, it is to be understood that to simplify the showing thereof only enough of the structure of the apparatus for eliminating undulation errors on gear-tooth flanks has been illustrated therein as is needed to enable one skilled in the art to readily understand the underlying principles and concepts of this invention. Turning now specifically to FIG. 1 of the drawings, the apparatus illustrated therein by way of example and not limitation and employed to realize the method as hereinbefore described will be seen to comprise a rotary table 10 for a gear blank 12 whose drive means is shown in exploded partial view. In operation the gear 12 is fixed upon the rotary table 10. The rotary table 10 is rotated by a rotary drive or drive mechanism comprising a worm 14 and a worm wheel or gear 16. The rotary table 10 is rotatably journaled in a pitch or module carriage 18 which is driven by a linear drive or pitch spindle 20 engaging a corresponding thread in the pitch carriage 18 to impart a translatory motion to the rotary table 10 corresponding to the pitch or module of the gear being fabricated. This rotary drive mechanism and the linear drive or pitch spindle cooperate to form a pitch-spacing transmission or circular pitch gearbox.

Corrugations or undulations W1 and W2 are shown on one gear-tooth flank of the gear 12. These corrugations or undulations W1 and W2 are caused by errors in the drive train 14, 16 and 20 and jointly represent a gear-tooth undulation error which is to be eliminated. The undulations W1 are caused by errors of the linear drive spindle 20 and the undulations W2 are caused by errors of the worm drive 14 and 16 when a generating motion is induced between the gear-tooth flank and a gear-fabricating tool, such as the grinding disks 30 and 30' shown in FIG. 2, by rotating the rotary table 10 with the gear 12 fixed thereupon by means of the worm drive 14 and 16 at a predetermined angular velocity and simultaneously translating the rotary table 10 by means of the linear drive spindle 20 at a predetermined linear velocity.

Figure 2:
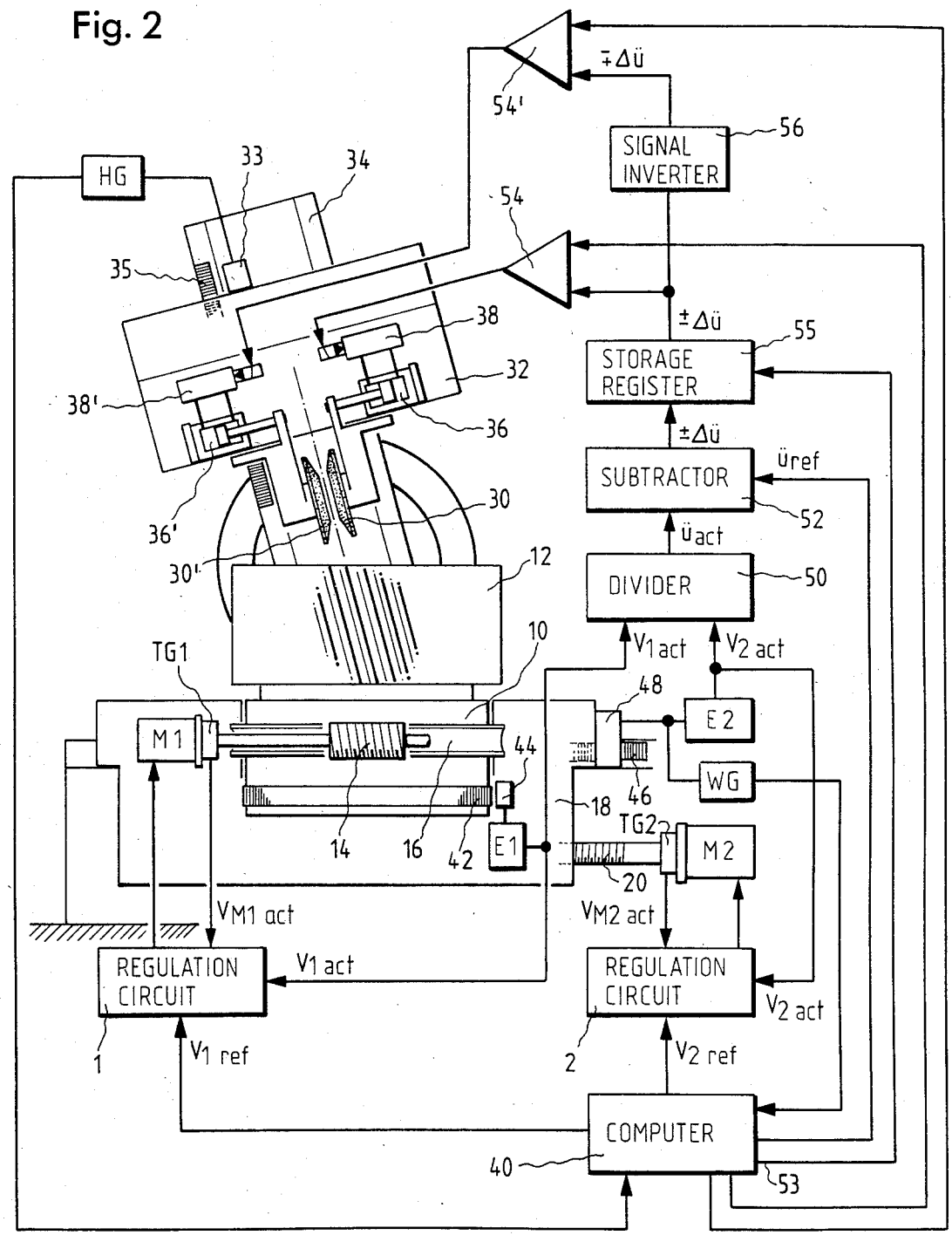
FIG. 2 schematically shows a gear-tooth flank grinding machine for helical gears operating according to the generating method and which is provided with the apparatus according to the invention.

FIG. 2 shows the invention employed in a gear grinding machine operating according to the generating method for grinding the gear-tooth flanks of helical gears. The construction and operation of such a machine are described here only in as far as necessary for understanding the present invention, since such construction and operation are known per se.

The machine is equipped with two grinding disks 30 and 30' as gear-fabricating tools and with which two gear-tooth flanks are simultaneously ground. A tool carriage 32 is translatable along a carriage slide or guideway 34 which is adjustable to any desired gear helix angle. Each grinding disk 30 and 30' has an associated feed drive 36 and 36', respectively, with the aid of which the grinding disks 30 and 30' can be moved toward the gear-tooth flanks and away from them. In the embodiment shown, the feed motions induced by the feed drives 36 and 36' are controlled by servo-valves 38 and 38', respectively. A computer 40 or other suitable parameter processing device provides the servo-valves 38 and 38' with the corresponding feed commands.

In the embodiment shown, the rotary drive worm 14 is driven by an electric motor M1 whose rotary speed is regulated with the help of a regulating circuit 1. The regulating circuit 1 receives a motor reference speed $V_{1ref}$ from the computer 40, compares this motor reference speed with a motor momentary speed $V_{M1act}$ supplied by a tachometer TG1 and suitably controls the drive motor M1 through a control unit or circuit, such as the control unit or circuit 118 shown in FIG. 3a.

A drive motor M2 drives the pitch or linear drive spindle 20 which induces the translatory motion of the pitch carriage 18 and with it the rotary table 10. A tachometer TG2 is associated with the drive motor M2 which senses the momentary rotary speed $V_{M2act}$ of the drive motor M2 and therefore of the pitch spindle or linear drive spindle 20 and transmits it to a regulating circuit 2 which also receives a reference speed $V_{2ref}$ of the drive motor M2 from the computer 40 and controls the drive motor M2 corresponding to the difference value formed between the reference value and the momentary value, i.e. momentary actual value.

The presence of the regulating circuits 1 and 2 is not essential for the operation of the invention, but is advantageous. If drive motors M1 and M2 are employed which have a sufficient constancy of angular velocity even without regulating circuits, then regulating circuits are rendered superfluous for the known machine hitherto described. In the arrangement according to the invention they would nevertheless be advantageous, since then the desired result is further improved, as will be explained in more detail hereinbelow.

A measurement device E1 is associated with the rotary table 10. An incremental scale 42 fastened to the rotary table 10 moves past a sensing or scanning head 44 which delivers pulses to the measurement device E1 which are proportional to the rotary speed or angular velocity of the rotary table 10. Such an incremental measurement system is known, for instance from the German Patent Publication No. 2,758,525, published June 28, 1979, to which reference may be had and the disclosure of which is incorporated herein by reference.

A further incremental scale 46 is fastened to the machine opposite the pitch carriage 18. A scanning or sensing head 48 fixedly attached to the pitch carriage 18 moves past this incremental scale 46 and transmits output pulses to a measurement device E2, which in this manner determines the translatory speed or linear velocity of the pitch carriage 18 and therefore of the rotary table 10. This incremental scale system has essentially the same construction as the one previously described. A significant difference is that the incremental scale 42 is circular while the incremental scale 46 is straight or linear.

The outputs of the measurement devices E1 and E2 are connected with two inputs of a divider circuit 50. The divider circuit 50 receives in this manner a signal from the measurement device E1 which represents the momentary rotary speed or angular velocity $V_{1act}$ of the rotary table 10 as well as a signal from the measurement device E2 representing the momentary translatory speed or linear velocity $V_{2act}$ of the rotary table 10. The relationship or ratio $Ü_{act}=V_{1act}/V_{2act}$ in formed. This drive ratio $Ü_{act}$ would be equal to a reference drive ratio $Ü_{ref}=V_{1ref}/V_{2ref}$ stored in the computer 40 if the drive motors M1 and M2 had the desired constant rotary speed and there were no errors in the drive train between these drive motors M1 and M2 and the rotary table 10. This ideal case practically never arises.

The reference drive ratio $Ü_{ref}$ is taken from gearing tables and input to the computer 40 in advance. The computer 40 also determines the generating position of the gear wheel 12 and the stroke position of the grinding disks 30 and 30'. The output of the scanning head 48 is also connected to a generation position transducer WG for this purpose. The generation position transducer WG determines the momentary generating position of the gear 12 from the pulses which it receives and transmits the generating position to the computer 40.

A scanning head 33 is connected to the tool carriage 32 and moves past an incremental scale 35 and is connected to a stroke position transducer HG. The stroke position transducer HG determines the momentary stroke position of the grinding disks 30 and 30' from the pulses which it receives and transmits the momentary stroke position to the computer 40. The purpose of determining the generating and stroke positions will be explained in more detail hereinbelow.

A subtractor circuit 52 is connected subsequent to the divider circuit 50 and has an input which is connected to an output of the computer 40 and receives a signal emanating from the computer 40 and representing the reference drive ratio $Ü_{ref}$. The difference $ΔÜ$ between the reference drive ratio $Ü_{ref}$ and the momentary drive ratio $Ü_{act}$ emanating from the divider circuit 50 is formed in the subtractor circuit 52. The output of the subtractor circuit 52 applies a signal corresponding to this algebraically signed drive ratio difference to an input of a storage register 55 which stores it.

The signals from the subtractor circuit 52 stored by the storage register 55 are stored in association with the corresponding generating position of the gear 12 and with the corresponding stroke position of the grinding disks 30 and 30' by the intermediary of the signals received from the generating and stroke position output 53 of the computer 40. The storage register 55 therefore fulfills, with the help of the computer 40, the task of circumventing the mechanical and electrical inertia of the apparatus. This mechanical and electrical inertia of the apparatus would manifest itself as a temporal delay between the time of determination of the mometary drive ratio $\ddot{U}_{act}$ and the time of execution of the correction by means of the grinding disks 30 and 30' at the gear-tooth flank.

The output of the storage register 55 is connected to an input of a summing or integrating amplifier 54 which receives a signal from the computer 40 at its further input which corresponds to the feed of the grinding disk 30. The summing amplifier 54 adds or subtracts the drive ratio difference $\Delta \ddot{U}$ according to its algebraic sign to or from the feed motion value and transmits a correspondingly corrected feed motion signal from its output to the servo-valve 38, so that the feed or advance of the grinding disk 30 is correspondingly reduced or increased.

In the exemplary embodiment herein described the further grinding disk 30' has associated with it not only the appropriate feed drive 36' and the appropriate servo-valve 38' but also a suitable summing amplifier 54'. The only difference between the feeds of the grinding disks 30 and 30' is that the subtractor circuit 52 transmits the signal $\pm \Delta \ddot{U}$ corresponding to the drive ratio difference through a sign-inverting circuit 56 with reversed algebraic sign (i.e. $+\Delta \ddot{U}$) to the summing amplifier 54. This is because the gear-tooth flanks ground by the grinding disk 30' are of opposite orientation to the gear-tooth flanks ground by the grinding disk 30.

In a first grinding cycle of a gear-tooth flank the gear-tooth flank is ground without any correction from the drive ratio difference $\Delta \ddot{U}$. As this gear-tooth flank is ground, the generating and stroke positions are simultaneously determined with the help of the computer 40, the generating position transducer WG and the stroke position transducer HG and the associated data are input by the computer 40 through its generating and stroke position output 53 into the storage register 55. These data are then applied at the proper time and under the control of the computer 40 to the input of the summing amplifier 54 (and with inverted algebraic sign to the input of the summing amplifier 54') as drive ratio differences $\pm \Delta \ddot{U}$ during another grinding cycle to the same gear-tooth flanks in a further grinding revolution in accordance with the generating position of the gear 12 and the stroke position of the grinding disk 30. The summing amplifier 54 then controls the servo-valve 38, so that the feed of the grinding disk 30 is correspondingly increased or reduced. Analogously, the summing amplifier 54' then controls the servo-valve 38', so that the feed or advance of the grinding disk 30' is correspondingly reduced or increased.

Additionally, the measured drive ratio differences can be compared in the storage register 55 with those delivered by the subtractor circuit 52 and saved as pragmatic values and correspondingly evaluated so that later, under favorable conditions, repetitions of the measurement procedure are superfluous. The previously employed expression "at the proper time" is to be understood to mean taking into consideration a rate time or lead time corresponding to the aforementioned time delay, which is input to the computer 40 as a constant value.

In the block circuit diagram of the arrangement according to the invention illustrated in FIG. 2, potentials or pulses are transmitted through the conductors designated with arrows. The respective digital/analog and analog/digital converters required in the conductors designated with arrows have been omitted for the sake of representational clarity.

With the arrangement previously described in relation to FIG. 2, corrugations or undulations in the gear-tooth flanks caused by errors in the drive train between the drive motors M1 and M2 can be avoided in simple and reliable manner by determining a speed-drive ratio difference corresponding to the errors in the drive train and appropriately correcting therewith the feed motions of the grinding disks.

Figure 3A:
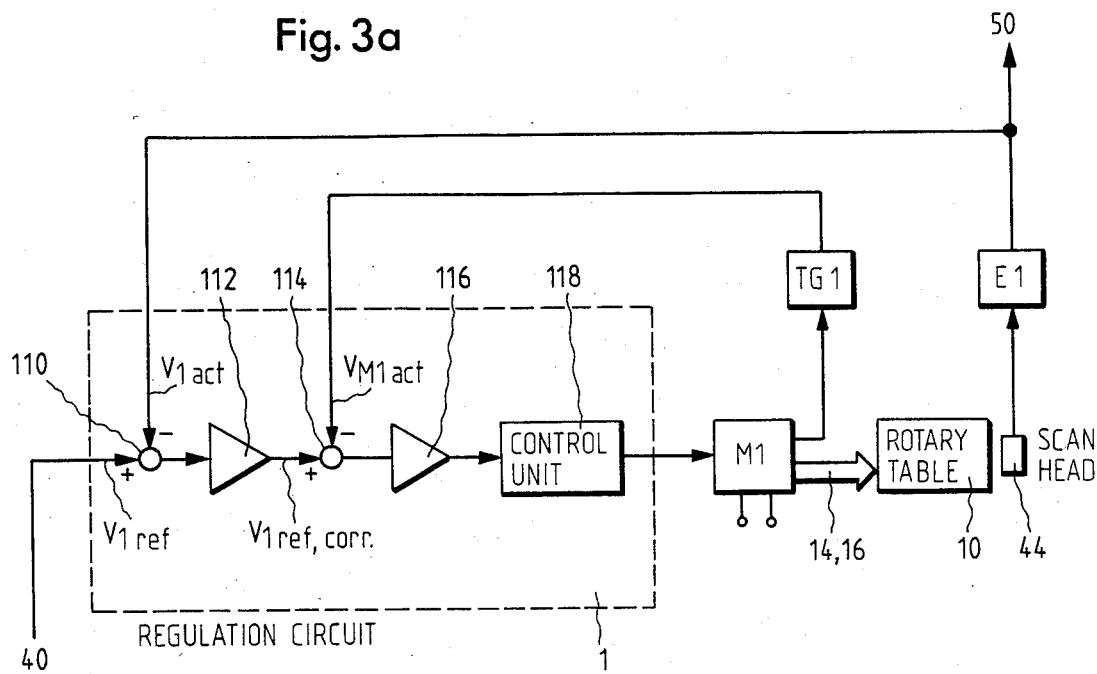
FIGS. 3a and 3b diagrammatically show regulation circuits of the drive mechanisms of the rotary table of the machine shown in FIG. 2.
Figure 3B:
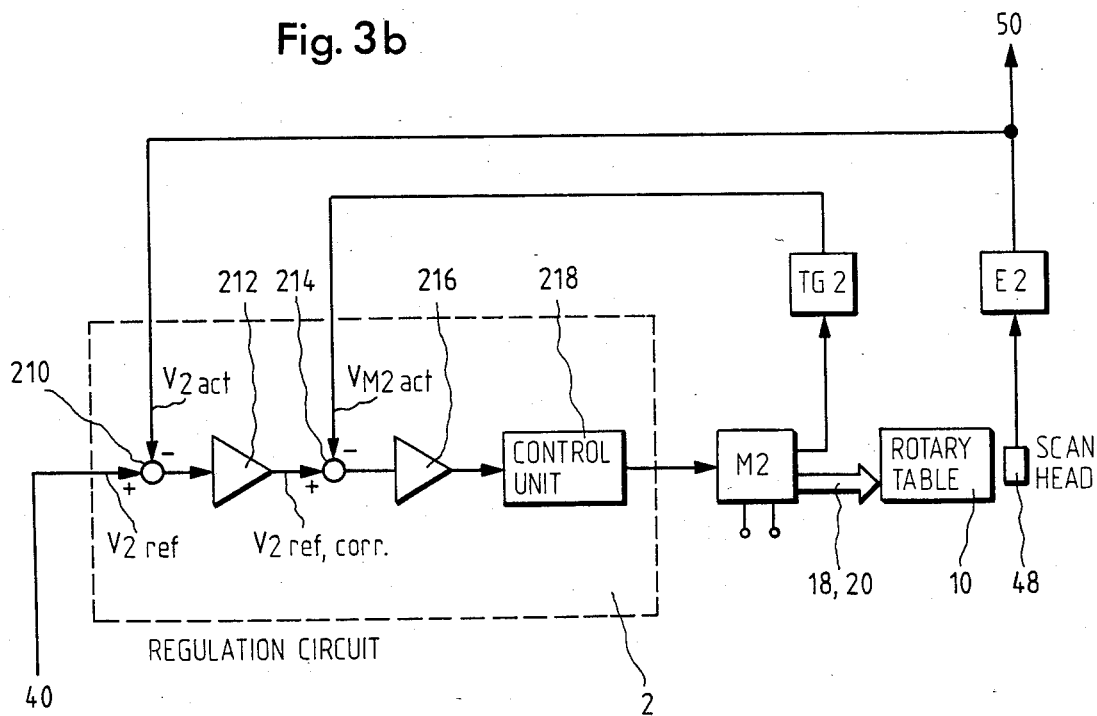

The regulating circuits 1 and 2 are shown in more detail in the FIGS. 3a and 3b. According to the invention a further correction is undertaken in these regulating circuits with the help of the output signals of the measurement devices E1 and E2, in order to improve the accuracy of the drive ratio difference $\Delta \ddot{U}$ to be determined and simultaneously to reduce the absolute amount of the same. Since the circuit construction is identical in both case, only the construction and operation of the arrangement illustrated in FIG. 3a will be described in the following.

The regulating circuit 1, which is surrounded by a broken line in FIG. 3a and corresponds to the regulating circuit 1 of FIG. 2, contains a suitable summation or integration point or unit 110 which receives a signal from the computer 40 corresponding to the reference rotary speed or angular velocity $V_{1ref}$ of the rotary table and a signal from the measurement device E1 representing the momentary rotary speed or angular velocity $V_{1act}$ of the rotary table 10, adds them together and transmits the result to a further suitable summation or integration point or unit 114 as the corrected reference rotary speed or angular velocity $V_{1ref,corr}$. This further summation or integration point or unit 114 also receives a signal from the tachometer TG1 representing the momentary motor rotary speed $V_{M1act}$.

The summation or integration point or unit 114 transmits an output signal formed from the addition of both received signals through a further regulating amplifier 116 to a control unit or circuit 118 which, finally, appropriately adjusts the rotary speed of the drive motor M1 and thereby undertakes a preliminary correction of the rotary speed or angular velocity of the rotary table 10. Without this preliminary correction, errors in the speed of the drive worm 14 would enter into the rotary speed or angular velocity of the rotary table 10 and would therefore then have to be corrected by means of a correspondingly larger feed motion correction of the grinding disks 30 and 30'.

The arrangement illustrated in FIG. 3b performs a analogous correction of the translatory speed or linear velocity of the rotary table 10. Components in FIG. 3b are designated with reference characters increased in value by 100 in relation to corresponding components in FIG. 3a.

While there are shown and described present preferred embodiments of the invention, it is to be distinctly understood that the invention is not limited thereto, but may be otherwise variously embodied and practiced within the scope of the following claims.
ACCORDINGLY,
What we claim is:

1. A method for eliminating undulation errors on gear-tooth flanks when fabricating gears in a production gear-fabricating machine, wherein a generating motion corresponding to a desired involute profile is induced between at least one gear-fabricating tool and at least one gear-tooth flank by rotating a rotary table upon which a gear being fabricated is fixed at a predetermined angular velocity and by simultaneously translating the rotary table at a predetermined linear velocity, comprising the steps of:

determining a reference drive ratio between a reference angular velocity and a reference linear velocity for said rotary table;

measuring momentary angular velocities and momentary linear velocities of said rotary table during fabrication of each said at least one gear-tooth flank;

determining momentary drive ratios between said momentary angular velocities and said momentary linear velocities;

forming difference values between said reference drive ratio and said momentary drive ratios;

storing said difference values in association with momentary generating motion positions of said gear being fabricated and in association with momentary stroke positions of said at least one gear-fabricating tool at least until a further fabricating cycle; and correcting feed motion values for said at least one gear-fabricating tool by the amount of said difference values during said further fabricating cycle for each said at least one gear-tooth flank at said associated generating motion and stroke motion positions.

2. The method as defined in claim 1, further including the step of:

correcting said reference angular velocity and said reference linear velocity by means of speed regulation devices which take into account said measured momentary angular velocities and said measured momentary linear velocities as well as momentary speeds of motors rotating and translating said rotary table before performing said step of determining said momentary drive ratios between said momentary angular velocities and said momentary linear velocities.

3. The method as defined in claim 1, wherein:

said at least one gear-fabricating tool comprises first and second gear-fabricating tools;

said at least one gear tooth flank comprises first and second gear tooth flanks of mutually opposite orientation;

said step of correcting feed motion values being performed in relation to said first gear fabricating tool; and simultaneously correcting feed motion values for said second gear-fabricating tool by the negative amount of said difference values during said further fabricating cycle for each gear-tooth flank at said associated generating motion and stroke motion positions.

4. A method for eliminating undulation errors on gear-tooth flanks when fabricating gears in a production gear-fabricating machine, wherein a generating motion corresponding to a desired involute profile is induced between a first gear-fabricating tool and a first gear-tooth flank as well as between a second gear-fabricating tool and a second gear-tooth flank of opposite orientation to said first gear-tooth flank by rotating a rotary table upon which a gear being fabricated is fixed at a predetermined angular velocity and by simultaneously translating the rotary table at a predetermined linear velocity, comprising the steps of:

determining a reference drive ratio between a reference angular velocity and a reference linear velocity for said rotary table;

measuring momentary angular velocities and momentary linear velocities of said rotary table during fabrication of each gear-tooth flank;

determining momentary drive ratios between said momentary angular velocities and said momentary linear velocities;

forming difference values between said reference drive ratio and said momentary drive ratios;

storing said difference values in association with momentary generating motion positions of said gear being fabricated and in association with momentary stroke positions of said gear-fabricating tools at least until a further fabricating cycle;

correcting feed motion values for said first gear-fabricating tool by the amount of said difference values during said further fabricating cycle for each gear-tooth flank at said associated generating motion and stroke motion positions; and simultaneously correcting feed motion values for said second gear-fabricating tool by the negative amount of said difference values during said further fabricating cycle for each gear-tooth flank at said associated generating motion and stroke motion positions.

5. The method as defined in claim 4, including the further step of:

correcting said reference angular velocity and said reference linear velocity by means of speed regulation devices which take into account said measured momentary angular velocities and said measured momentary linear velocities as well as momentary speeds of motors rotating and translating said rotary table before performing said step of determining said momentary drive ratios between said momentary angular velocities and said momentary linear velocities.

6. An apparatus for eliminating undulation errors on gear-tooth flanks when fabricating gears in a production gear-fabricating machine having a rotary table for the gear to be fabricated, comprising:

a first drive mechanism associated with said rotary table for rotating said rotary table at a predetermined angular velocity together with said gear to be fabricated and a second drive mechanism associated with said rotary table for simultaneously translating said rotary table at a predetermined linear velocity together with said gear to be fabricated for inducing a generating motion corresponding to a desired involute profile between at least one gear-fabricating tool and at least one gear-tooth flank;

measurement devices associated with said rotary table for monitoring said angular and linear velocities;

a computer for determining a reference drive ratio between a reference angular velocity and a reference linear velocity for said rotary table;

a generating roll position transducer for determining a momentary generating roll position of said gear to be fabricated;

a stroke position transducer for determining a momentary stroke position of said at least one gear-fabricating tool;

a first measuring device for measuring momentary angular velocities of said rotary table;

a second measuring device for measuring momentary linear velocities of said rotary table;

a divider device for determining momentary drive ratios between said momentary angular velocities measured by said first measuring device and said momentary linear velocities measured by said second measuring device;

a subtractor device for forming difference values between said reference drive ratio and said momentary drive ratios;

said subtractor device having an output;

said computer having a generating roll and stroke output;

a storage device connected to said output of said subtractor device and to said generating roll and stroke output of said computer for storing said difference values in association with momentary generating roll positions of said gear to be fabricated and in association with momentary stroke positions of said at least one gear-fabricating tool;

said storage device having an output;

said gear-fabricating tool having a servo-valve; and a first correction device connected to said output of said storage device and to said servo-valve for correcting feed motion values for said at least one gear-fabricating tool by the amount of said difference values.

7. The apparatus as defined in claim 6, wherein:

said production gear-fabricating machine comprises a further gear-fabricating tool for engaging a further gear-tooth flank oppositely oriented to said at least one gear-tooth flank;

a further servo-valve associated with said further gear-fabricating tool;

an algebraic sign-inversion device connected to said output of said storage device; and a second correction device connected to said further servo-valve and to said storage device via said algebraic sign-inversion device for correcting further feed motion values for said further gear-fabricating tool by the negative amount of said difference values.

8. The apparatus as defined in claim 6, wherein:

said first and second drive mechanisms each comprise a first and second drive motor and a respective speed regulating circuit for regulating the speed of said first and second drive motors;

said first drive mechanism driving said rotary table via a drive train including a pitch-spacing transmission;

said second drive mechanism driving said rotary table via a drive train including a linear drive spindle;

a first summation point for summing together said reference angular velocity and said momentary angular velocities of said rotary table provided in each said speed regulating circuit in series with the associated one of said drive motors for generating corrected reference angular velocity values for said rotary table;

each said speed regulating circuit comprising a control circuit for adjusting said speed of its associated one of said drive motors; and a second summation point for summing together said corrected reference angular velocity values of said rotary table and said momentary speed value of said associated drive motor provided in each said speed regulating circuit for generating an adjustment value for said control circuit for adjusting said speed of the associated one of said drive motors.

* * * * *